United States Patent
Chen et al.

(10) Patent No.: US 10,533,902 B2
(45) Date of Patent: Jan. 14, 2020

(54) SPLIT DETECTION DEVICE

(71) Applicant: HIWIN TECHNOLOGIES CORP., Taichung (TW)

(72) Inventors: Wang-Chih Chen, Taichung (TW); Yih-Chyun Hwang, Taichung (TW); Szu-Wei Yu, Taichung (TW); Min-Hsiu Wu, Taichung (TW); Yi-Jun Feng, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 192 days.

(21) Appl. No.: 15/868,994

(22) Filed: Jan. 11, 2018

(65) Prior Publication Data

US 2019/0212185 A1 Jul. 11, 2019

(51) Int. Cl.
*G01K 13/06* (2006.01)
*G01H 1/00* (2006.01)

(52) U.S. Cl.
CPC ............ *G01K 13/06* (2013.01); *G01H 1/00* (2013.01)

(58) Field of Classification Search
CPC .......... G01H 1/00; G01H 1/003; G01K 13/08
USPC ........................................................ 73/649
See application file for complete search history.

(56) References Cited

U.S. PATENT DOCUMENTS

| | | | | |
|---|---|---|---|---|
| 6,695,470 B1 * | 2/2004 | Berndorfer | ............ | G01K 3/10 374/45 |
| 9,182,023 B2 * | 11/2015 | Jiang | ............ | F16H 25/2214 |
| 9,188,164 B2 * | 11/2015 | Huag | ............ | F16H 25/2214 |
| 9,194,477 B2 * | 11/2015 | Lee | ............ | F16H 57/01 |
| 9,759,311 B2 * | 9/2017 | Chu | ............ | F16H 57/0497 |
| 2009/0071278 A1 | 3/2009 | Chiu et al. | | |
| 2017/0241845 A1 | 8/2017 | Hwang et al. | | |

FOREIGN PATENT DOCUMENTS

| | | |
|---|---|---|
| JP | 201114124 | 1/2011 |
| JP | 201114124 | 4/2013 |
| JP | 2017133919 | 8/2017 |
| KR | 10-0594941 | 7/2006 |
| KR | 10-2011-0133184 | 12/2011 |
| TW | 201043809 | 12/2010 |

OTHER PUBLICATIONS

Burton, E. A.: FIVR—Fully Integrated Voltage Regulators on 4th Generation Intel® CoreTM SoCs. 2014 IEEE Applied Power Electronics Conference and Exposition—APEC 2014, S. 432-439. IEEE Xplore [online]. DOI: 10. 1109/APEC.2014.6803344.

* cited by examiner

*Primary Examiner* — Jacques M Saint Surin
(74) *Attorney, Agent, or Firm* — Leong C. Lei

(57) ABSTRACT

A split detection device includes: a detection unit, which includes a detection casing and a sensor that is mounted inside the detection casing; a processing unit, which includes a processing casing and a processor that is mounted inside the processing casing; a connection unit, which is electrically connected between the sensor of the detection unit and the processor of the processing unit; and a transmission unit, which is electrically connected between the processor of the processing unit and an external device. By setting up the sensor and the processor inside different casings to be separate from each other, influence of the processor on the sensor can be reduced to thereby improve accuracy of detection.

9 Claims, 5 Drawing Sheets

SPLIT DETECTION DEVICE

TECHNICAL FIELD OF THE INVENTION

The present invention relates generally to a detection device, and more particularly to a split detection device.

DESCRIPTION OF THE PRIOR ART

A linear transmission device is often provided with a detection device mounted thereon to detect parameters of for example temperature, vibration, and torque.

Generally, the detection device is mounted one a moving part on the linear transmission device (such as a slide block of a linear slide track or a nut of a ball screw). The detection device has a structure that is generally made up of a mounting casing, a circuit board, a detection chip, and a processing chip. The mounting casing is mounted to the moving part of the linear transmission device. The circuit board is disposed inside the mounting casing. The detection chip and the processing chip are mounted on the circuit board and are in electrical connection with each other. As such, a signal detected by the detection chip is transmitted to the processing chip for processing and a value obtained with the operation of the processing hip is supplied to a terminal device (such as a computer) to allow a machine operator to immediately get aware of the values of temperature, vibration, and torque of the moving part.

However, due to thermal energy and minute vibration generated in the operation of the processing chip, the detection chip that is mounted on the same circuit board would inevitably affected so that errors of detection may be caused and the accuracy of detection become worse.

SUMMARY OF THE INVENTION

In view of this, to improve the deficiency of the prior art that detection errors may readily occur in a prior art detection device and thus deteriorate accuracy of detection, the present invention provides a split detection device, which generally comprises: a detection unit, which comprises a detection casing and a sensor, the sensor being mounted inside the detection casing; a processing unit, which comprises a processing casing and a processor, the processor being mounted inside the processing casing; a connection unit, which is electrically connected between the sensor of the detection unit and the processor of the processing unit; and a transmission unit, which is electrically connected between the processor of the processing unit and an external device. By setting up the sensor and the processor inside different casings to be separate from each other, influence of the processor on the sensor can be reduced to thereby improve accuracy of detection.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
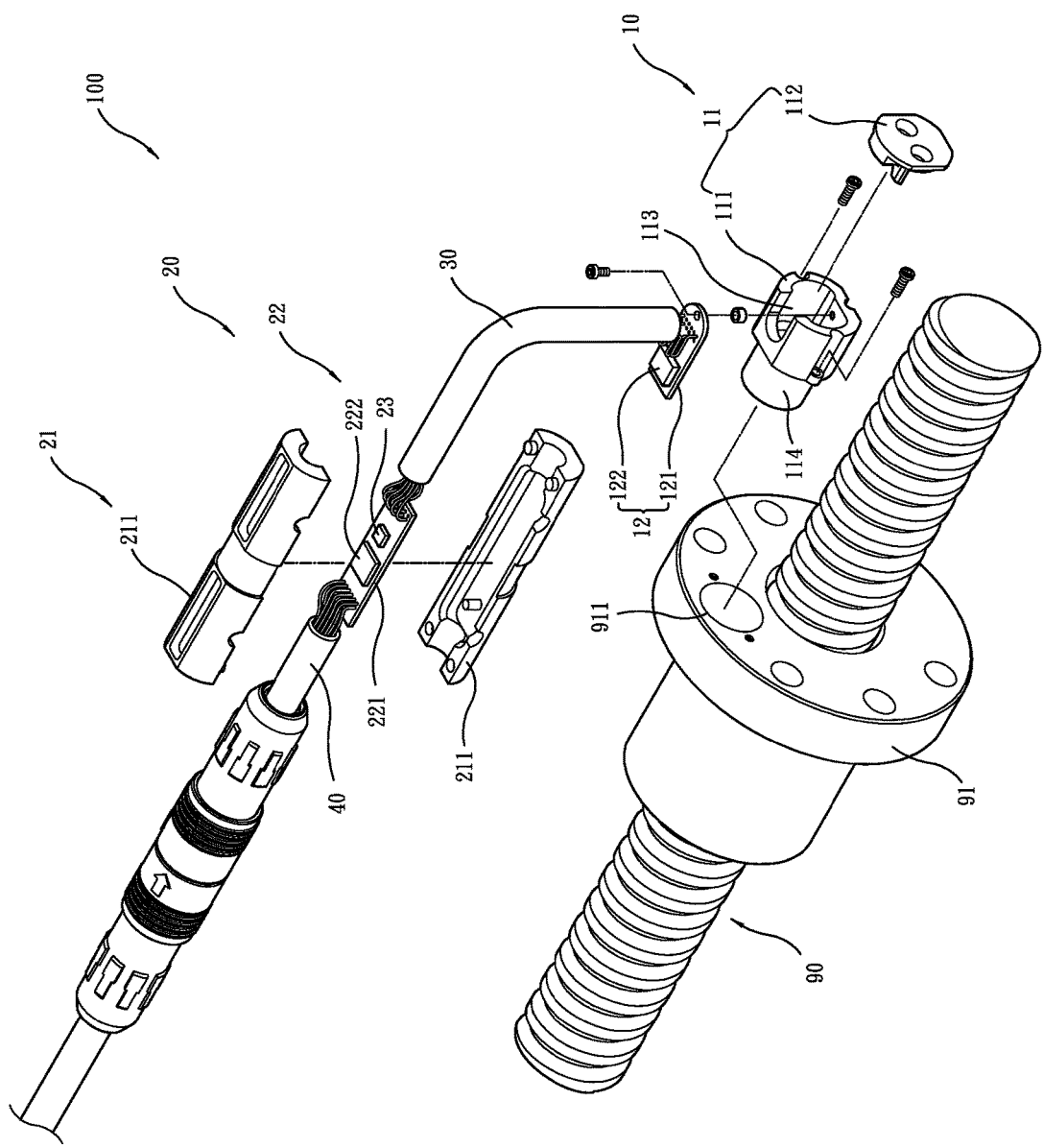
FIG. 1 is an exploded view showing a first preferred embodiment of the present invention.
Figure 2:
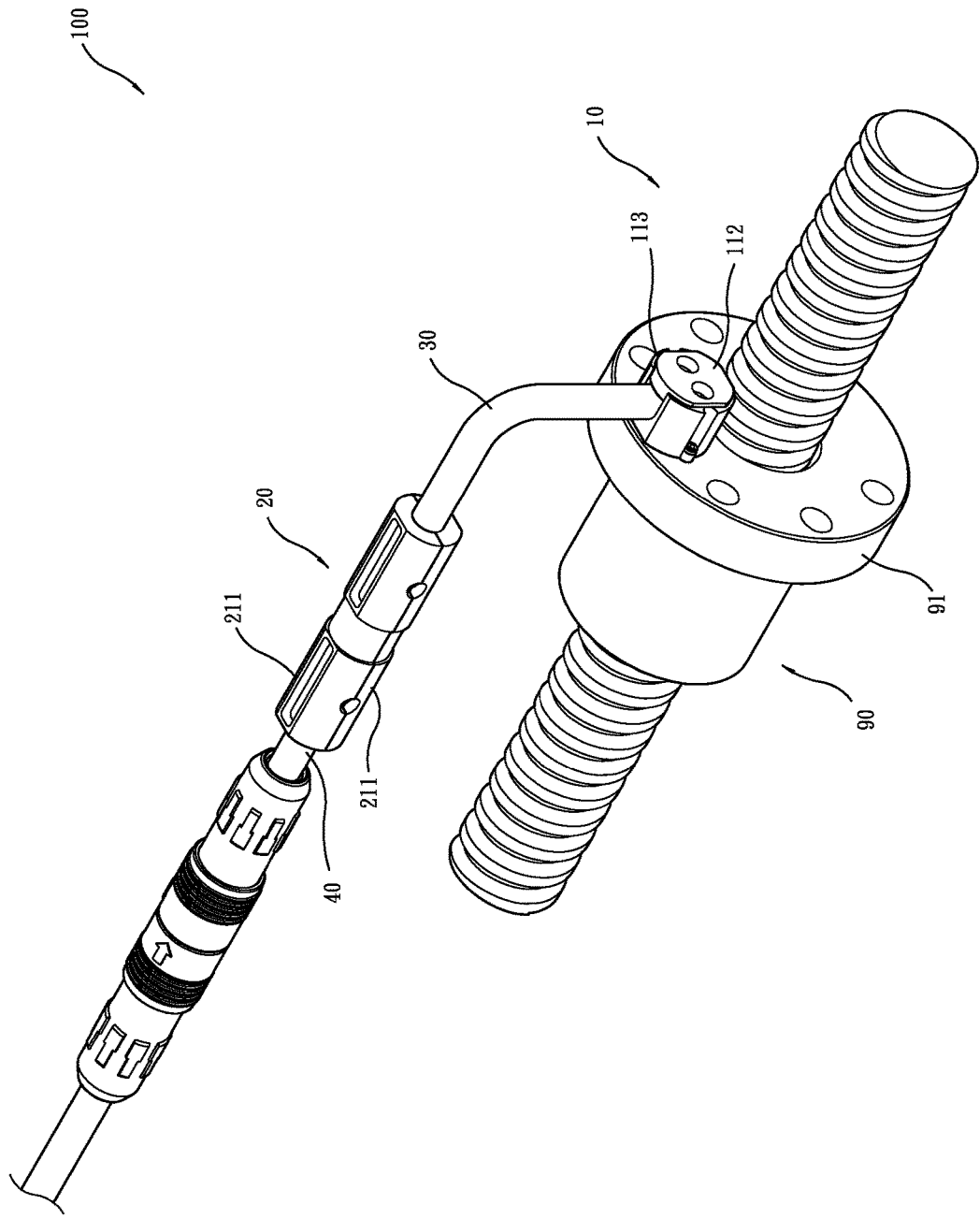
FIG. 2 is a perspective view showing the embodiment of FIG. 1 in an assembled condition.
Figure 3:
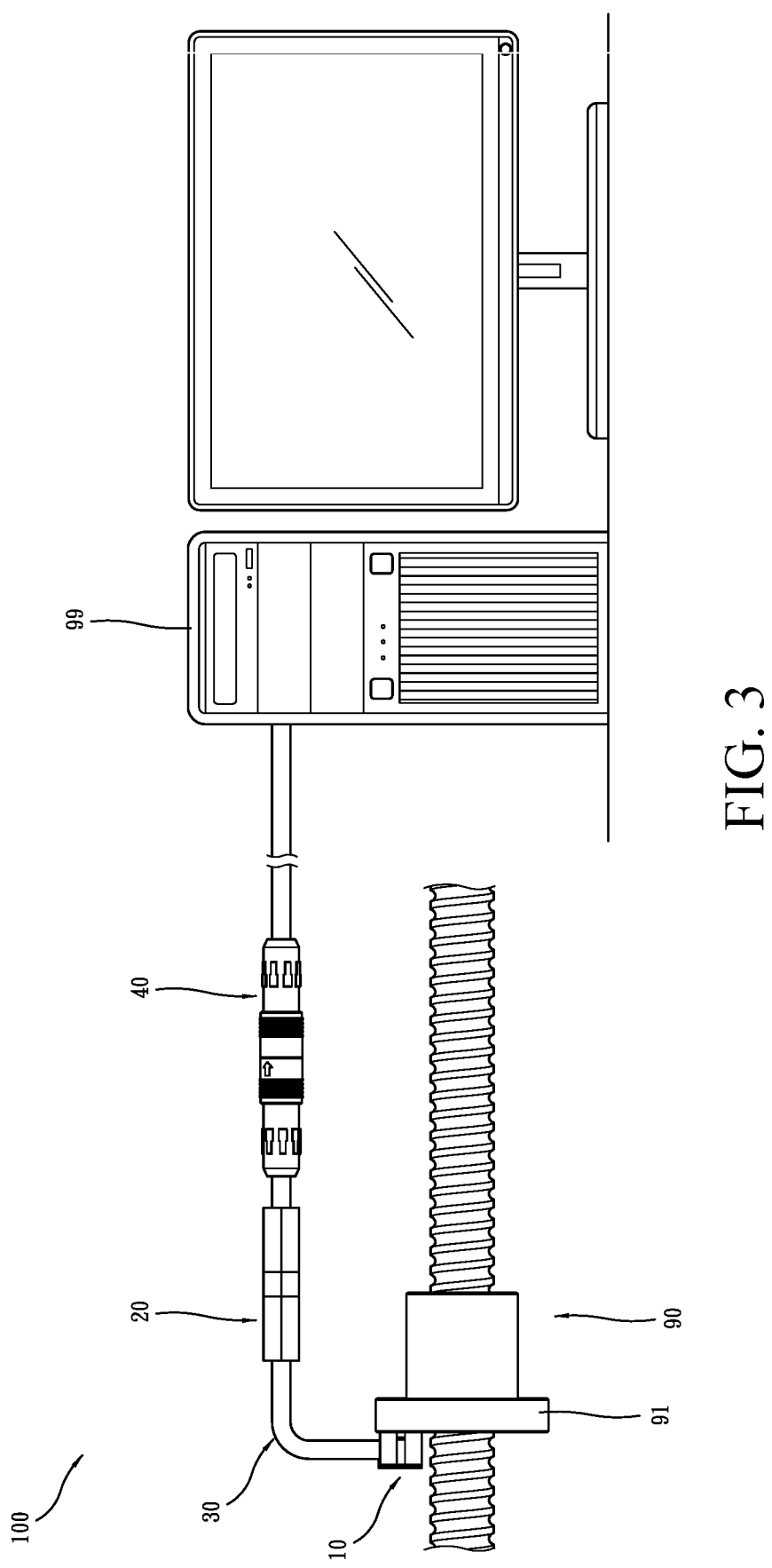
FIG. 3 is a schematic view showing a configuration of the embodiment of FIG. 1.

Referring to FIGS. 1-3, the present invention provides, in a first preferred embodiment, a split detection device 100, which generally comprises a detection unit 10, a processing unit 20, a connection unit 30, and a transmission unit 40.

Referring to FIGS. 1 and 2, the detection unit 10 comprises a detection casing 11 and a sensor 12. The detection casing 11 comprises an accommodation seat 111 and a closure lid 112. The accommodation seat 111 comprises a retention section 113 and an out-projection section 114 that integrally projects outward from an end of the retention section 113. The accommodation seat 111 is fixedly mounted to a moving part 91 of a linear transmission device 90. In the instant embodiment, the linear transmission device 90 comprises a ball screw, and the moving part 91 is a nut. The moving part 91 has an axially-facing surface that is partly recessed to form a insertion channel 911. The out-projection section 114 is insertable into the insertion channel 911. The closure lid 112 closes an opposite end of the accommodation seat 111. The sensor 12 comprises a detection circuit board 121 and a detection chip 122. The detection circuit board 121 is mounted in an interior of the detection casing 11. The detection chip 122 is mounted on the detection circuit board 121. The detection chip 122 is operable to detect a temperature. The detection chip 122 is located in an interior of the out-projection section 114.

Referring to FIGS. 1 and 2, the processing unit 20 comprises a processing casing 21, a processor 22, and a power module 23. The processing casing 21 comprises two outer casing members 211 that mate and join to each other. The processor 22 comprises a processing circuit board 221 and a processing chip 222. The processing circuit board 221 is mounted in an interior of he processing casing 21. The processing chip 222 is mounted to the processing circuit board 221. The processing chip 222 is operable for computation and processing. The power module 23 is mounted on the processing circuit board 221 for regulating a voltage level.

Referring to FIGS. 1 and 2, the connection unit 30 comprises a physical conductor line, which is electrically connected between the detection circuit board 121 of the detection unit 10 and the processing circuit board 221 of the processing unit 20 so that a signal detected by the detection chip 122 is transmittable through the connection unit 30 to the processing chip 222 for processing and electrical power is supplied from the power module 23 through the connection unit 30 to the detection chip 122.

Referring to FIGS. 1-3, the transmission unit 40 comprises a physical conductor line electrically connected between the processing circuit board 221 of the processing unit 20 and an external device 99 for transmission of signals and electrical power. The external device 99 can be for example a computer.

The above provides a description of components of the split detection device 100 according to the first preferred embodiment of the present invention and assembly thereof. Features of operation will be described below:

Firstly, in an operation of the present invention, the transmission unit 40 transmits electrical power to the power module 23 of the processing unit 20 to allow the electrical power, after regulation of a voltage level thereof conducted with the power module 23, to be transmitted through the connection unit 30 to the detection chip 122 of the detection unit 10, in order to provide necessary power for the operation of the detection chip 122 to conduct detection of a temperature of the moving part 911 and to transmit a signal of the temperature so detected through the connection unit 30 to the processing chip 222 of the processing unit 20 for processing. A value obtained with the processing conducted with the processing chip 222 is then transmitted through the transmission unit 40 to the external device 99 to allow a machine operator to instantaneously monitor and control the temperature of the moving part 91 to maintain a normal operation thereof.

Thus, in this invention, the processing chip 222 and the power module 23 of which the operations may generate thermal energy and vibration are separated from the detection chip 122 of which an operation is conducted for detecting a temperature so as to be arranged in split and different circuit boards and mounted in split and different casings, such that the thermal energy and vibration generated by the processing chip 222 and the power module 23 are isolated and do not interfere with and affect the operation of the detection chip 122, thereby ensuring accuracy of detection of the detection chip 122. Experiments carried with the present invention reveal that a preferred spacing distance between the detection unit 10 and the processing unit 20 ranges from 1-200 centimeters.

Further, in the above-described embodiment, the detection chip 122 is operable to detect a temperature; however, the detection chip may also be operable to detect other physical parameters, such as vibration and torque.

Further, in the above-described embodiment, although the connection unit 30 is described as a physical transmission line, the connection unit 30 can alternatively be of a configuration made up of two wireless transmitters, wherein one of the wireless transmitter is mounted on the detection circuit board 121 of the detection unit 10 and the other one of the wireless transmitters is mounted on the processing circuit board 221 of the processing unit 20 and transmission of signals and electrical power is carried out in a wireless manner between the two wireless transmitters. The same purpose can also be achieved.

Further, in the above-described embodiment, although the transmission unit 40 is described as a physical transmission line, the transmission unit 40 can alternatively be of a configuration made up of two wireless transmitters, wherein one of the wireless transmitter is mounted on the processing circuit board 221 of the processing unit 20 and the other one of the wireless transmitters is mounted on the external device 99 and transmission of signals and electrical power is carried out in a wireless manner between the two wireless transmitters. The same purpose can also be achieved.

Although, in the above-described embodiment, the linear transmission device is a ball screw and the moving part is a nut, the linear transmission device can also be a linear slide track and the moving part is a slide block. The same purpose can also be achieved.

Figure 4:
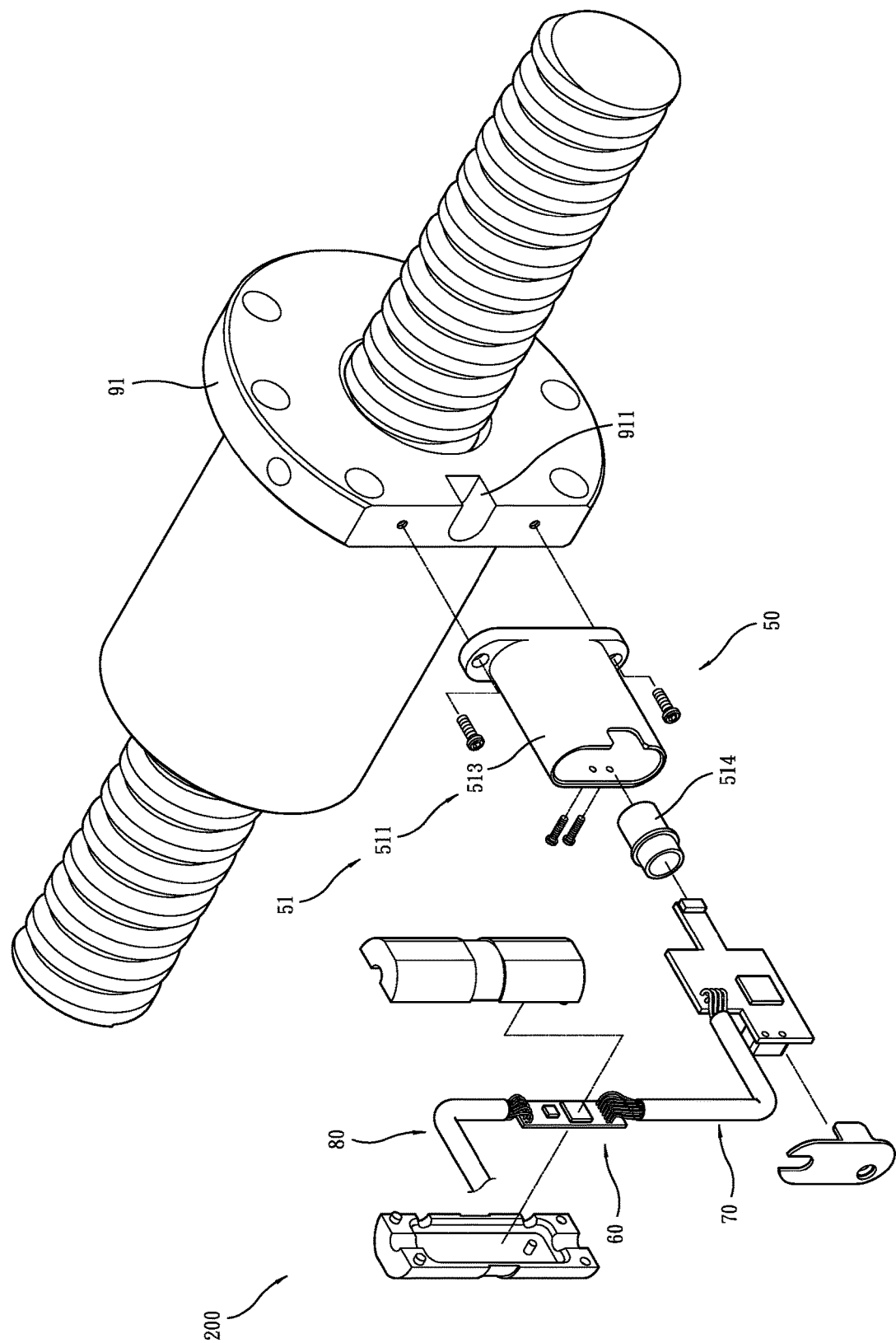
FIG. 4 is an exploded view showing a second preferred embodiment of the present invention.
Figure 5:
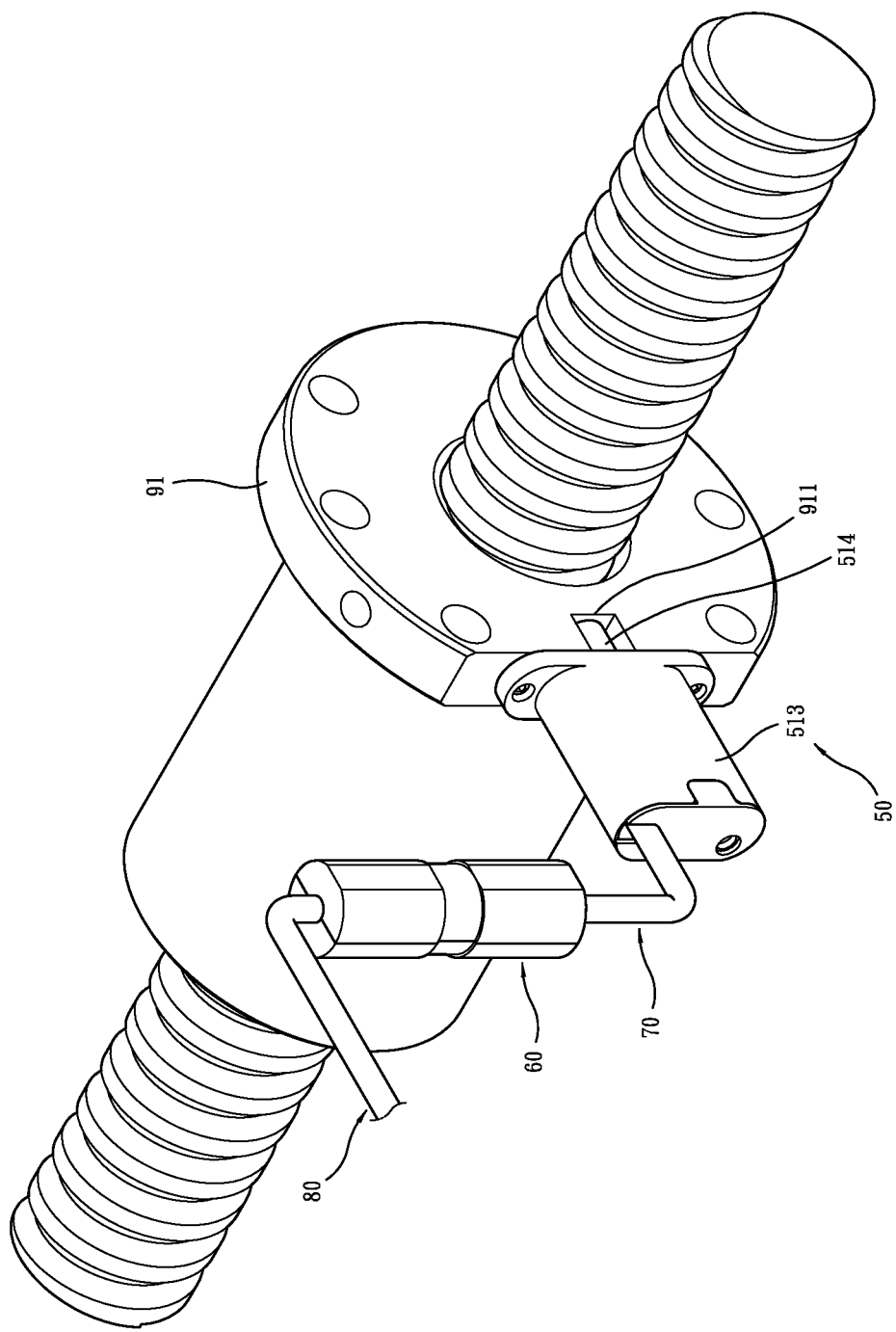
FIG. 5 is a perspective view showing the embodiment of FIG. 4 in an assembled condition.

Referring to FIGS. 4 and 5, the present invention provides, in a second preferred embodiment, a split detection device 200, which, similar to the first embodiment, comprises a detection unit 50, a processing unit 60, a connection unit 70, and a transmission unit 80. A difference between the two embodiments is as follows:

In the instant embodiment, a detection casing 51 of a detection unit 50 is structured such that an accommodation seat 511 is fixedly mountable to a radially-facing surface of a moving part 91 and the radially-facing surface is partly recessed to form an insertion channel 911 that receives insertion of an out-projection section 514 of the accommodation seat 511. The out-projection section 514 and a retention section 513 of the accommodation seat 511 are separate components.

Although in the instant embodiment, the detection casing 51 and the moving part 91 are disposed in a way that is different from the first embodiment, they provide the same functionality and serve the same purpose.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A split detection device, comprising:
   a detection unit, which comprises a detection casing and a sensor, the sensor being arranged in an interior of the detection casing;
   a processing unit, which comprises a processing casing and a processor, the processor being arranged in an interior of the processing casing;
   a connection unit, which is electrically connected between the sensor of the detection unit and the processor of the processing unit; and
   a transmission unit, which is electrically connected between the processor of the processing unit and an external device;
   wherein the sensor comprises a detection circuit board and a detection chip, the detection circuit board being arranged in an interior of the detection casing, the detection chip being mounted to the detection circuit board; and
   the processor comprises a processing circuit board and a processing chip, the processing circuit board being arranged in an interior of the processing casing, the processing chip being mounted to the processing circuit board, the processing chip being operable to conduct a processing operation.

2. The split detection device according to claim 1, wherein the detection casing comprises an accommodation seat and a closure lid, the sensor being arranged in an interior of the accommodation seat, the closure lid attached to and closing an end of the accommodation seat, the accommodation seat comprising a retention section and an out-projection section projecting outward from an end of the retention section, the sensor being located in an interior of the out-projection section, the accommodation seat being configured to fixedly mount to a moving part of a linear transmission device, wherein the moving part is partly recessed to form an insertion channel and the out-projection section is inserted into the insertion channel.

3. The split detection device according to claim 2, wherein the detection casing of the detection unit is fixedly mounted to an axially-facing surface of the moving part.

4. The split detection device according to claim 2, wherein the detection casing of the detection unit is fixedly mounted to a radially-facing surface of the moving part.

5. The split detection device according to claim 1, wherein the detection chip is operable to detect at least one parameter of temperature, vibration, and torque.

6. The split detection device according to claim 1, wherein the processing unit further comprises a power module, the power module being mounted to the processing circuit board and being operable to regulate a voltage level.

7. The split detection device according to claim 1, wherein the connection unit and the transmission unit each comprises a physical conductor line for transmission of a signal and electrical power.

8. The split detection device according to claim 1, wherein the detection unit and the processing unit are spaced from each other by a spacing distance ranging between 1-200 centimeters.

9. The split detection device according to claim 1, wherein the connection unit comprises a configuration comprising two wireless transmitters, one of the wireless transmitters being mounted to the sensor of the detection unit, the other one of the wireless transmitters being mounted to the processor of the processing unit; and the transmission unit comprises a configuration comprising two wireless transmitters, one of the wireless transmitters being mounted to the processor of the processing unit, the other one of the wireless transmitters being mounted to the external device.

* * * * *